(12) United States Patent
Yuan et al.

(10) Patent No.: US 10,952,256 B2
(45) Date of Patent: Mar. 16, 2021

(54) RESOURCE MAPPING METHOD AND APPARATUS (71) Applicant: HUAWEI TECHNOLOGIES CO., LTD, Shenzhen (CN)

(72) Inventors: Pu Yuan, Shanghai (CN); Jun Luo, Kista (SE); Jin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/458,182

(22) Filed: Jun. 30, 2019

(65) Prior Publication Data
US 2019/0357263 A1 Nov. 21, 2019

Related U.S. Application Data (63) Continuation of application No. PCT/CN2017/118013, filed on Dec. 22, 2017.

(30) Foreign Application Priority Data

Dec. 30, 2016 (CN) .......................... 201611261885.6

(51) Int. Cl.
*H04W 4/00* (2018.01)
*H04W 74/08* (2009.01)
*H04W 72/04* (2009.01)

(52) U.S. Cl.
CPC ... *H04W 74/0833* (2013.01); *H04W 72/0413* (2013.01); *H04W 72/046* (2013.01)

(58) Field of Classification Search
CPC ......... H04W 74/0833; H04W 72/0413; H04W 72/046; H04W 72/04; H04W 74/08
See application file for complete search history.

(56) References Cited

U.S. PATENT DOCUMENTS

2012/0314664 A1 12/2012 Johansson et al.
2013/0301567 A1 11/2013 Jeong et al.
2014/0010178 A1 1/2014 Yu et al.
(Continued)

FOREIGN PATENT DOCUMENTS

| CN | 104285385 A | 1/2015 |
|---|---|---|
| CN | 104412519 A | 3/2015 |
| CN | 105379357 A | 3/2016 |

OTHER PUBLICATIONS

R1-1609117; Samsung; Discussion on RA procedure; 3GPP TSG RAN WG1 #86-bis; Lisbon, Portugal Oct. 10-14, 2016; Agenda item:8.1.5.2total 4 pages.
(Continued)

*Primary Examiner* — Abdelnabi O Musa
(74) *Attorney, Agent, or Firm* — Kilpatrick Townsend & Stockton LLP (57) ABSTRACT

Embodiments can provide a random access method. In this method, a preamble sequence can be sent by user equipment (UE), and a random access response can be received by the UE. The random access response includes information for sending a message 3, and the information for sending the message 3 is used by the user equipment to determine a beam for sending the message 3. The beam for sending the message 3 can then be determined based on the information for sending the message 3. The message 3 can be sent by using the determined beam.

15 Claims, 7 Drawing Sheets

(56) References Cited

U.S. PATENT DOCUMENTS

2016/0029358 A1* 1/2016 Hou .................. H04W 74/0833
  370/329
2017/0005764 A1* 1/2017 Park ..................... H04L 5/0051
2019/0182817 A1* 6/2019 Agiwal ............. H04W 72/0406

OTHER PUBLICATIONS

R1-1612462; Samsung; Preamble design aspects for NR RACH without beam correspondence; 3GPP TSG RAN WG1 Meeting #87; Reno, Nevada, USA, Nov. 14-18, 2016; Agenda Item: 7.1.2.3; total 5 pages.
R2-165110; ZTE; NR Random access procedure; 3GPP TSG-RAN WG2 Meeting #95Gothenburg, Sweden, Aug. 22-26, 2016; Agenda item:9.4.3.2; total 7 pages.
R2-167568 Samsung,"Random Access Procedure in NR",3GPP TSG-RAN WG2 #96, Reno, USA, Nov. 14-18, 2016, total 7 pages.

* cited by examiner

RESOURCE MAPPING METHOD AND APPARATUS

CROSS-REFERENCE TO RELATED APPLICATIONS

This application is a continuation of International Application No. PCT/CN2017/118013, filed on Dec. 22, 2017, which claims priority to Chinese Patent Application No. 201611261885.6, filed on Dec. 30, 2016. The disclosures of the aforementioned applications are hereby incorporated by reference in their entireties.

TECHNICAL FIELD

This application relates to the communications field, and more specifically, to a random access method and apparatus.

BACKGROUND

A random access procedure starts when a user sends a random access preamble to attempt to access a network and ends before a basic signaling connection is established between the user and the network. Random access is a critical step in a mobile communications system and is also a final step for establishing a communication link between a terminal and a base station. UE exchanges information with the base station through random access, to complete a subsequent operation such as calling, resource requesting, or data transmission. The UE implements uplink time synchronization with the system through random access. Random access performance directly affects user experience.

In NR technology research, a beamforming mechanism is introduced. To be specific, when a message is sent, an analog beam is formed in a specific direction to concentrate energy, thereby enhancing signal coverage. However, there is no relatively good random access mechanism.

SUMMARY

This application provides a random access method or apparatus.

According to a first aspect, a random access method is provided, and includes: sending, by user equipment, a preamble sequence; receiving, by the user equipment, a random access response, where the random access response includes information for sending a message 3, and the information for sending the message 3 is used by the user equipment to determine a beam for sending the message 3; determining, by the user equipment based on the information for sending the message 3, the beam for sending the message 3; and sending, by the user equipment, the message 3 by using the determined beam.

According to a second aspect, a random access method is provided, and includes: sending, by a first network device, a random access response, where the random access response includes information for sending a message 3, and the information for sending the message 3 is used by user equipment to determine a beam for sending the message 3.

According to a third aspect, a random access method is provided, and includes: sending, by user equipment, a preamble sequence; receiving, by the user equipment, a random access response, where the random access response includes information for sending data, and the information for sending the data is used by the user equipment to determine a beam for sending the data; determining, by the user equipment based on the information for sending the data, the beam for sending the data; and sending, by the user equipment, the data by using the determined beam.

In an optional implementation, the information for sending the data includes port information; and the determining, by the user equipment based on the information for sending the data, the beam for sending the data is specifically: determining, by the user equipment based on the port information, the beam for sending the data.

In an optional implementation, the determining, by the user equipment based on the port information, the beam for sending the data is specifically: determining, by the user equipment based on the port information, sending time information for sending the data, and determining, based on the sending time information, the beam for sending the data.

In an optional implementation, the user equipment determines, based on the port information, a time-frequency resource for sending the data, and the sending, by the user equipment, the data by using the determined beam is specifically: sending, by the user equipment, the data based on the determined time-frequency resource and beam for sending the data.

In an optional implementation, the information for sending the data includes sending time information; and the determining, by the user equipment based on the information for sending the data, the beam for sending the data is specifically: determining, by the user equipment based on the sending time information, the beam for sending the data.

In an optional implementation, the information for sending the data further includes port information; the user equipment determines, based on the port information, a time-frequency resource for sending the data; and the sending, by the user equipment, the data by using the determined beam is specifically: sending, by the user equipment, the data based on the determined time-frequency resource and beam for sending the data.

In an optional implementation, the information for sending the data includes beam information; and the determining, by the user equipment based on the information for sending the data, the beam for sending the data is specifically: determining, by the user equipment based on the beam information, the beam for sending the data.

In an optional implementation, the information for sending the data includes network device information and beam information that is used by a network device to receive the preamble sequence; and the determining, by the user equipment based on the information for sending the data, the beam for sending the data is specifically: determining, by the user equipment based on the network device information and the beam information that is used by the network device to receive the preamble sequence, the beam for sending the data.

In an optional implementation, the random access response is sent by one or more first network devices, and the first network device is a network device that sends the random access response to the user equipment.

In an optional implementation, the method is applied to a high frequency scenario.

In an optional implementation, the method is used in a communications network, the communications network includes a first network device and a second network device, and the second network device is a network device that receives the data sent by the user equipment but does not send the random access response.

According to a fourth aspect, a random access method is provided, and includes: sending, by a first network device, a random access response, where the random access response includes information for sending data, and the information for sending the data is used by user equipment to determine a beam for sending the data.

In an optional implementation, the information for sending the data may be the same as the information for sending the data according to the third aspect.

According to a fifth aspect, a random access method is provided, and includes: sending, by user equipment, a preamble sequence; receiving, by the user equipment, a random access response; sending, by the user equipment, a message 3 in a beam sweeping manner; and receiving, by the user equipment, a conflict resolution message.

According to a sixth aspect, a random access method is provided, and includes: receiving, by a network device, a preamble sequence; sending, by the network device, a random access response; receiving, by the network device, a message 3 in a beam sweeping manner; and sending, by the network device, a conflict resolution message.

According to a seventh aspect, a random access method is provided, and includes: sending, by user equipment, a preamble sequence; receiving, by the user equipment, a random access response; sending, by the user equipment, data in a beam sweeping manner; and receiving, by the user equipment, a conflict resolution message.

According to an eighth aspect, a random access method is provided, and includes: receiving, by a network device, a preamble sequence; sending, by the network device, a random access response; receiving, by the network device, data in a beam sweeping manner; and sending, by the network device, a conflict resolution message.

According to a ninth aspect, an apparatus is provided. The apparatus includes a processor and a transceiver, and may perform the method in any one of the first to the eighth aspects, or the optional implementations of the first to the eighth aspects.

According to a tenth aspect, a computer storage medium is provided. The computer storage medium stores program code, and the program code may be used to instruct to perform the method in any one of the first to the eighth aspects, or the optional implementations of the first to the eighth aspects.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art according to the embodiments of the present invention without creative efforts shall fall within the protection scope of the present invention.

The terms such as "component", "module", and "system" used in this specification are used to indicate computer-related entities, hardware, firmware, combinations of hardware and software, software, or software being executed. For example, the component may be but is not limited to a process that runs on a processor, a processor, an object, an executable file, a thread of execution, a program, and/or a computer. As shown in figures, both a computing device and an application that runs on the computing device may be components. One or more components may reside within the process and/or the thread of execution, and the components may be located on one computer and/or distributed on two or more computers. In addition, these components may be executed from various computer readable media that store various data structures. For example, the components may communicate by using a local and/or remote process and based on, a signal having one or more data packets (for example, data from two components interacting with another component in a local system, a distributed system, and/or across a network such as the Internet interacting with another system by using the signal).

It should be understood that the technical solutions in the embodiments of the present invention may be applied to various communications systems such as a global system for mobile communications (Global System for Mobile Communications, "GSM" for short), a code division multiple access (Code Division Multiple Access, "CDMA" for short) system, a wideband code division multiple access (Wideband Code Division Multiple Access, "WCDMA" for short) system, a long term evolution (Long Term Evolution, "LTE" for short) system, an LTE frequency division duplex (Frequency Division Duplex, "FDD" for short) system, an LTE time division duplex (Time Division Duplex, "TDD" for short) system, a universal mobile telecommunications system (Universal Mobile Telecommunications System, "UMTS" for short), and a future 5G communications system.

The present invention describes the embodiments with reference to user equipment. The user equipment may be alternatively an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device, another processing device connected to a wireless modem, an in-vehicle device, a wearable device, user equipment in a future 5G network, or user equipment in a future evolved PLMN network.

The present invention describes the embodiments with reference to a network device. The network device may be a device configured to communicate with the user equipment. For example, the network device may be a base transceiver station (Base Transceiver Station, "BTS" for short) in the GSM or the CDMA system, may be a NodeB (NodeB, "NB" for short) in the WCDMA system, or may be an evolved NodeB (Evolutional NodeB, "eNB" or "eNodeB" for short) in the LTE system. Alternatively, the network device may be a relay station, an access point, an in-vehicle device, a wearable device, a network side device in the future 5G network, a network device in the future evolved PLMN network, or the like.

"A and/or B" in the embodiments of this application indicates three relationships: A, B, or A and B.

Figure 1:
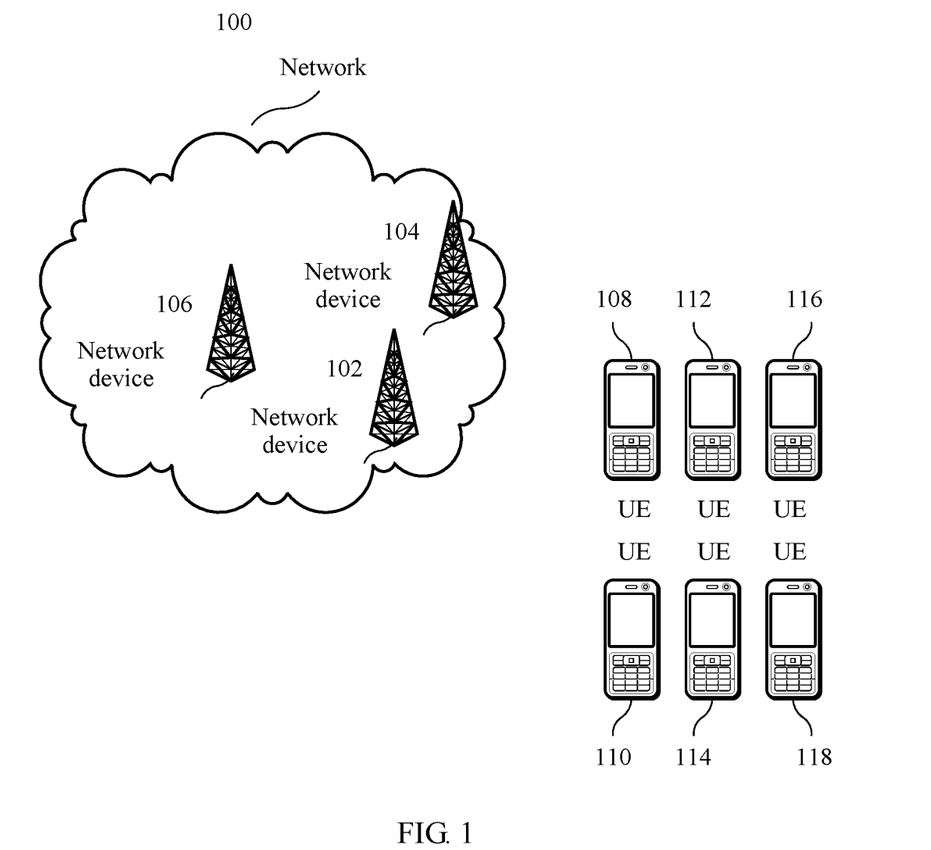
FIG. 1 is a diagram of an application scenario according to an embodiment of this application.

As shown in FIG. 1, the embodiments of the present invention may be applied to a communications network 100. The communications network includes a plurality of network devices 102, 104, and 106 and one or more user equipments 108, 110, 112, 114, 116, and 118.

In LTE, a random access channel is mainly used to implement uplink timing synchronization for a user, so that an eNodeB can schedule an uplink orthogonal synchronization resource for the user.

Figure 2:
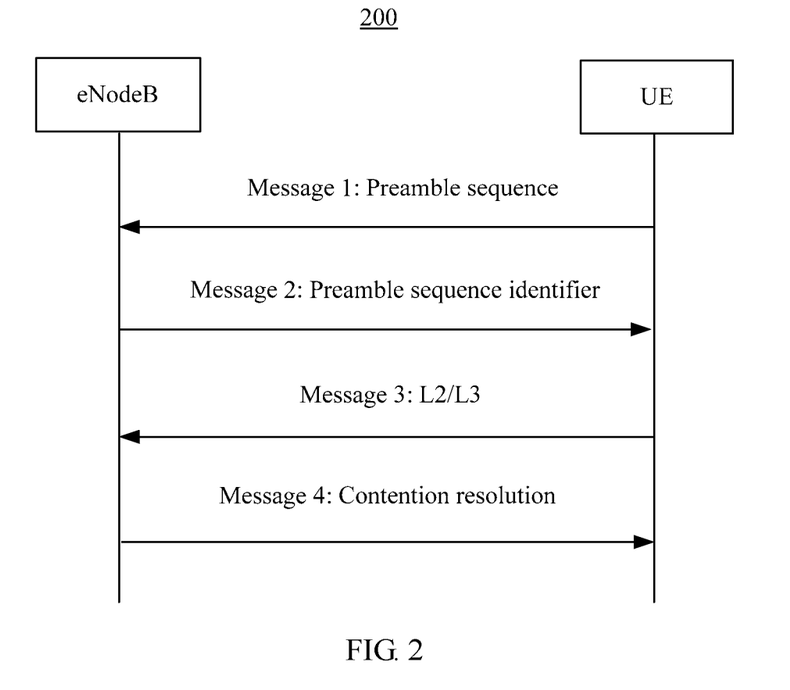
FIG. 2 is a schematic diagram of processing of random access in the prior art.

As shown in FIG. 2, a contention-based random access procedure may be divided into the following four steps:

1. Transmit a preamble sequence.
2. Random access response.
3. Send a message 3.
4. Send a contention conflict resolution message.

Messages sent in the foregoing four steps are respectively referred to as a message 1 (Msg. 1 for short), a message 2 (Msg. 2 for short), a message 3 (Msg. 3 for short), and a message 4 (Msg. 4 for short).

In an existing LTE technology, the random access procedure is performed in a single-point to single-point manner. To be specific, one random access procedure occurs only between one UE and one eNodeB.

Message 1: The UE first sends the message 1. The message 1 includes a random access preamble sequence, and 1 bit is added to the message 1 to indicate a size of the message 3.

Message 2: After receiving and detecting the random access preamble sequence, the eNodeB sends the message 2, namely, the random access response. The message 2 includes a detected preamble sequence identifier, a timing alignment command (TA command), an initial uplink resource of the message 3 (a UL grant for the Msg. 3), and a cell radio network temporary identifier (Cell Radio Network Temporary Identifier, C-RNTI).

Message 3: The UE wants to receive a RAR in a preset time window. If the UE does not receive the RAR, the UE considers that random access fails, and resends the message 1. If the UE successfully receives the RAR, the UE sends the message 3, the UE transfers an exact random access procedure message, and the exact random access procedure message is determined based on different trigger events. The message sent by the UE is referred to as the msg. 3 instead of a specific message because there may be different messages based on different states of the UE and different application scenarios. Therefore, the messages are collectively referred to as a msg. 3, namely, a third message.

Usually, the message 3 carries L2/L3 content, and includes one unique 48-bit UE identifier that is used to resolve a conflict.

Message 4: After receiving the message 3, the eNodeB delivers the message 4 in a conflict resolution mechanism. The message 4 carries one unique identifier to specify winning UE. This process may be considered as a conflict resolution process.

Figure 3:
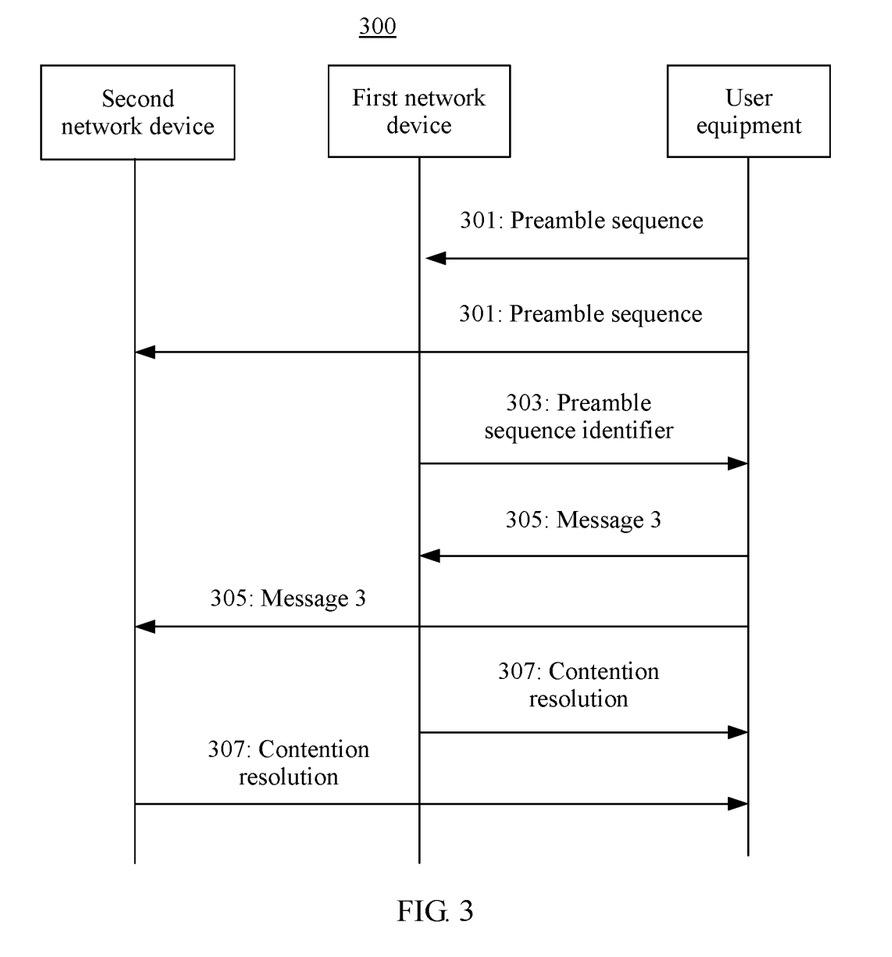
FIG. 3 is a schematic diagram of processing of a random access method according to an embodiment of this application.

FIG. 3 shows a random access method according to an embodiment. The method includes the following processing, and a description sequence of the processing does not represent a sequence relationship. There may be a plurality of first network devices and a plurality of second network devices, and only one first network device and one second network device are shown in the figure. Interaction between a plurality of network elements is described in this illustration. However, it does not mean that the included method needs to include the following plurality of network elements.

301: User equipment (English: user equipment, UE for short) may send a preamble sequence, where the user equipment may send the preamble sequence in a beam sweeping manner or by using a beam such as a preferred beam, and the preferred beam may be determined in a plurality of manners, for example, may be obtained by using a beam in an optimal direction or a suboptimal direction of a synchronization signal (for example, a downlink synchronization signal). In some embodiments, the user equipment sends the preamble sequence to one or more first network devices and/or one or more second network devices. "A plurality of" in this embodiment of the present invention means "two or more".

The one or more first network devices and/or the one or more second network devices may receive the preamble sequence, and the preamble sequence may be sent by the user equipment. It may also be understood that the one or more first network devices and/or the one or more second network devices may or may not be network devices that receive the preamble sequence.

The first network device may be a network device that sends a random access response. The first network device may or may not be a network device that receives a message 3, provided that the first network device is a network device that sends the random access response. The second network device is a network device that receives the message 3 but does not send the random access response.

303: The one or more first network devices send a random access response, where the one or more first network devices may send the random access response to the UE, and in some embodiments, the random access response may include information for sending a message 3. In this embodiment, although a name of the message 3 is also used, all or a part of content and usage of the message may be different from content and usage of the Msg. 3 in LTE. In addition, in some other embodiments, message 3 may have another name, and the another name also falls within the protection scope of this embodiment of the present invention. For example, the information for sending the message 3 includes the following content.

Content 1:

Information about the message 3 may include port information (certainly, the port information may also have another name), and the port information may be used to determine a beam for sending the message 3 by the user equipment. In some embodiments, the port information may be used to determine sending time information for sending the message 3 by the user equipment, to determine, based on the determined sending time information, the beam for sending the message 3. Further, optionally, the port information may be used to determine a time-frequency resource for sending the message 3 by the user equipment.

An example in which a correspondence is used for determining may be used to explain a determining method as follows: The port information may correspond to time-frequency resource information (for ease of description, the time-frequency resource information is denoted as T/F) and/or the sending time information. The sending time information may be a random access occasion (English: RACH Occasion, RO for short). Further, the time-frequency resource information and the sending time information may be time-frequency resource information for sending the message 3 (the message 3 may have another name) by the UE and the sending time information for sending the message 3 by the UE. A same time-frequency resource block may correspond to different sending time, and different sending time may correspond to different beams (English: beam).

A relationship between the foregoing several parameters is described below by using an example in which the port information has a one-to-one correspondence with the time-frequency resource information and the sending time information, the sending time information has a one-to-one correspondence with beam information, and the sending time information is a RO.

TABLE 1

| Port 1 | RO 1 |
|---|---|
| Port 2 | RO 2 |
| . . . | . . . |

TABLE 2

| Port 1 | T/F 1 |
|---|---|
| Port 2 | T/F 2 |
| . . . | . . . |

TABLE 3

| RO 1 | Beam 1 |
|---|---|
| RO 2 | Beam 2 |
| . . . | . . . |

In implementation, there may be various manners, and the manners are not limited to the foregoing example. For example, the UE may determine, based on a correspondence between port information and beam information, the beam for sending the message 3. Alternatively, for example, the UE may determine the sending time information based on a correspondence between port information and sending time information, and then determine, based on a correspondence between sending time information and beam information, the beam for sending the message 3. Alternatively, for example, the UE may determine, based on a correspondence between port information and time-frequency resource information, the time-frequency resource for sending the message 3. Because the information for sending the message 3 includes the port information, the UE may not need to care a TRP to which the message 3 is sent, provided that the message 3 is sent by using the determined beam (further, on the determined T/F). The random access response includes the port information, to indicate a plurality of pieces of parameter information, thereby reducing an exchange amount of air interface signaling and improving air interface efficiency. Certainly, the correspondence is a one-to-one correspondence in the foregoing example. Certainly, the correspondence may alternatively be another correspondence. For example, a correspondence between a RO and a beam may be a one-to-multiple correspondence. Therefore, a plurality of beams are determined based on one RO, and the UE may send the message 3 on the plurality of beams.

Content 2:

Information about the message 3 may include sending time information such as RACH occasion information, and the sending time information may be used to determine a beam for sending the message 3. The information about the message 3 may further include port information (the port information may have another name), and the port information may be used to determine a time-frequency resource for sending the message 3. In implementation, the beam for sending the message 3 and the time-frequency resource for sending the message 3 may be determined based on a correspondence, and a specific method may be similar to the description in the content 1.

This manner differs from the previous manner in that the port information does not indicate the sending time information. Although an exchange amount of air interface signaling is larger than that in the previous manner, there is a more explicit instruction. For description of another aspect of this manner, refer to the first manner. Details are not described again.

Content 3:

Information about the message 3 may include beam information, and the beam information is used to determine a beam for sending the message 3. The information about the message 3 may further include time-frequency resource information, and the time-frequency resource information is used to determine a time-frequency resource for sending the message 3. In this manner, a relatively low capability of the UE is required. The UE may directly send the message 3 based on the time-frequency resource information and the beam information that are carried in the random access response. Therefore, the UE may send the message 3 based on the received information by using the time-frequency resource and the beam that are indicated by the random access response.

Content 4:

The information for sending the message 3 may include network device information and beam information that is used by a network device to receive the preamble sequence. The UE may determine, based on the network device information and beam information that is used by the network device to receive the message, a beam for sending the message 3 by the UE. Further, the random access response may include time-frequency resource information, and the time-frequency resource information may be used to determine a time-frequency resource for sending the message 3. In implementation, the beam for sending the message 3 by the UE may be determined based on a correspondence, stored by the UE, between beam information for sending the message 3 by the UE and each of network device information and beam information that is used by the network device to receive the preamble sequence. Certainly, in implementation, the user equipment may alternatively determine, by jointly using the network device information, the beam information that is used by the network device to receive the preamble sequence, and the time-frequency resource information, the beam for sending the message 3. In one implementation, a determining method may be determined based on a correspondence. A specific method may be similar to the description in the content 1, and details are not described again. In this embodiment, the UE may send the message 3 on the time-frequency resource by using the determined beam.

The foregoing four types of content are just examples, and there are more implementations in implementation. Details are not described again.

The correspondences mentioned in the foregoing various manners, such as the correspondence between port information and time-frequency resource information, the correspondence between port information and sending time information, and the correspondence between sending time information and a beam each may be one-to-one correspondences, one-to-multiple correspondences, multiple-to-one correspondences, or multiple-to-multiple correspondences. The correspondence may be implemented by using a list, a program, an algorithm formula, or the like, and may be stored in the network device and/or the UE.

Figure 4:
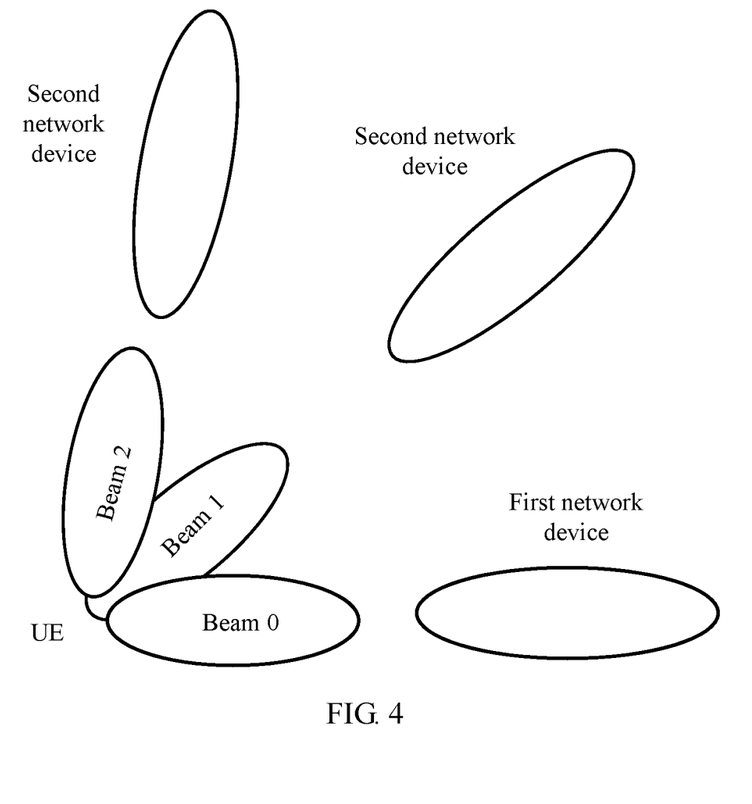
FIG. 4 is a schematic diagram of a sending and receiving manner according to an embodiment of this application.

305: The user equipment sends the message 3. In some embodiments, the message 3 may be sent and received in any one or a combination of the following manners:

Manner 1 is shown in FIG. 4.

The user equipment may determine, based on the information that is for sending the message 3 and that is included in the received random response, the beam for sending the message 3, to send the message 3 based on the determined beam. Further, the time-frequency resource for sending the message 3 is determined based on the information for sending the message 3, to send the message 3 by using the determined time-frequency resource and the determined beam. A random response message received by the user equipment includes different information, and different time-frequency resources for sending the message 3 and/or different beams for sending the message 3 are determined. For a specific determining method, refer to the foregoing description. Details are not described again. Because the information that is for sending the message 3 and that is carried in the random response message may be used to determine the beam for sending the message 3 by the user equipment, the determined beam may be the same as or different from a beam for sending the preamble sequence by the user equipment.

One or more network devices may also receive the message 3 by using a beam. The beam may be the same as or different from a beam for receiving the preamble sequence. "One network device" in the "one or more network devices" may be one first network device or one second network device. "A plurality of network devices" in the "one or more network devices" may include one or more first network devices and one or more second network devices, or may be a plurality of first network devices or a plurality of second network devices.

Figure 5:
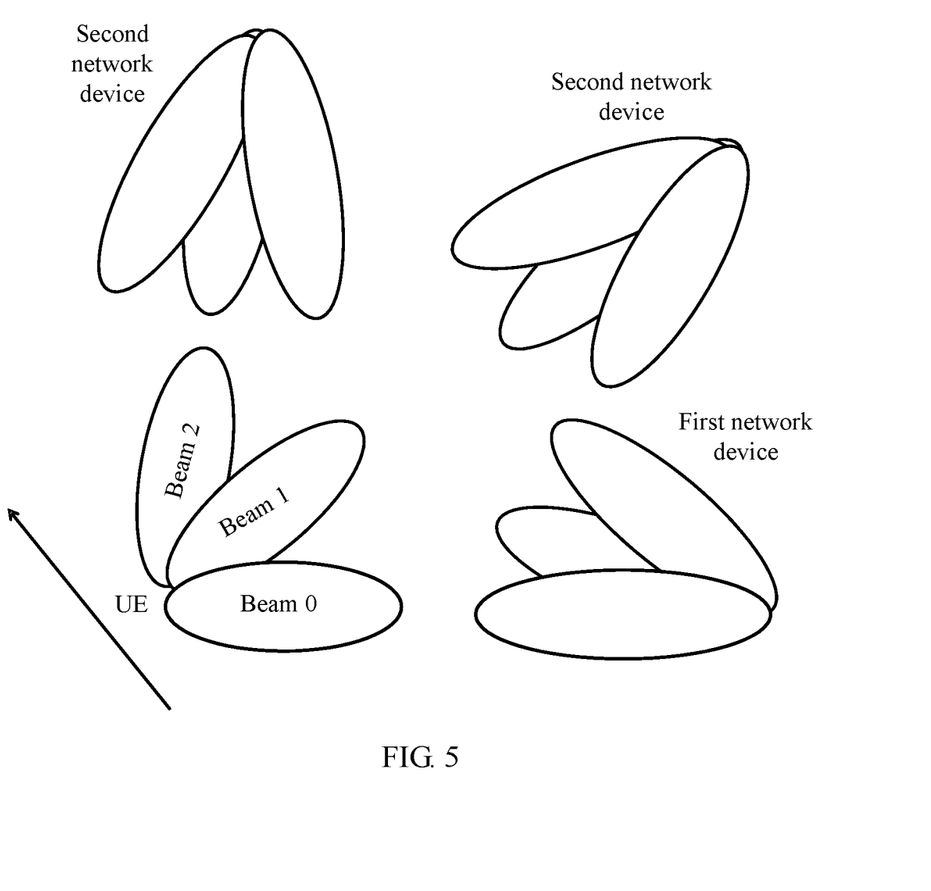
FIG. 5 is a schematic diagram of another sending and receiving manner according to an embodiment of this application.

Manner 2 is shown in FIG. 5.

The user equipment sends the message 3 in the beam sweeping manner.

With an increase in a quantity of mobile terminals and a data amount requirement of a user, bandwidth of a current frequency band below 6 G cannot meet an increasing communication data amount requirement. Therefore, using a high frequency (for example, higher than 6 G, 30 G to 300 G, or a higher frequency band) with abundant bandwidth resources as a backhaul frequency and an access frequency becomes a trend. However, compared with the frequency band below 6 G, a significant feature of the high frequency is a large path loss. To ensure a specific propagation distance, a high frequency beam needs to be relatively narrow to achieve a relatively large gain. However, a narrow beam system has a limited coverage area. To obtain an antenna gain, sending may be performed in the beam sweeping manner. It may also be understood that a plurality of directions are traversed one time for sending.

One or more network devices may also receive the message 3 in the beam sweeping manner. "One network device" in the "one or more network devices" may be one first network device or one second network device. "A plurality of network devices" in the "one or more network devices" may include one or more first network devices and one or more second network devices, or may be a plurality of first network devices or a plurality of second network devices. The one or more network devices may also search for an available beam in the beam sweeping manner, to receive the message 3, and the available beam may be an optimal beam, a suboptimal beam, or the like.

307: One or more network devices send a conflict resolution message. FIG. 3 shows only an example in which both the first network device and the second network device send the conflict resolution message. "One network device" in the "one or more network devices" may be one first network device or one second network device. "A plurality of network devices" in the "one or more network devices" may include one or more first network devices and one or more second network devices, or may be a plurality of first network devices or a plurality of second network devices. If the one or more network devices include one or more first network devices, a beam for sending the random access response may be used to send the conflict resolution message. The conflict resolution message is intended to notify the UE that a conflict has been resolved or that the UE has successfully completed random access.

The user equipment receives the conflict resolution message.

It can be learned from the embodiment in FIG. 3 that in a conventional communications network, usually, only one network device, for example, a radio access device NodeB provides a service for the UE. This embodiment may also be applied to the conventional communications network. This embodiment may also be applied to a communications network in which a plurality of network devices may provide a service for the UE, and the network device may be transparent to the UE. In other words, the UE does not need to know a network device that serves the UE. Therefore, although a plurality of network devices may serve the UE, the random access response may be sent by only one or more of the network devices. For example, the first network device sends the random access response, and not all network devices that serve the UE need to send the random access response. For example, the second network device does not send the random access response. Similarly, the conflict resolution message may also be sent by one or more of the network devices, and not all network devices that serve the UE need to send the conflict resolution message.

In addition, it can be learned from the embodiment in FIG. 3 that this embodiment may be applied to a high frequency scenario, and in this solution, a beam mechanism may be used to flexibly perform sending and receiving by using a beam sweeping technology, or to perform directional sending and receiving by using a beam. The beam may be determined by using some parameters. For example, in the foregoing embodiment, the beam is determined by using information carried in the random access response.

Figure 6:
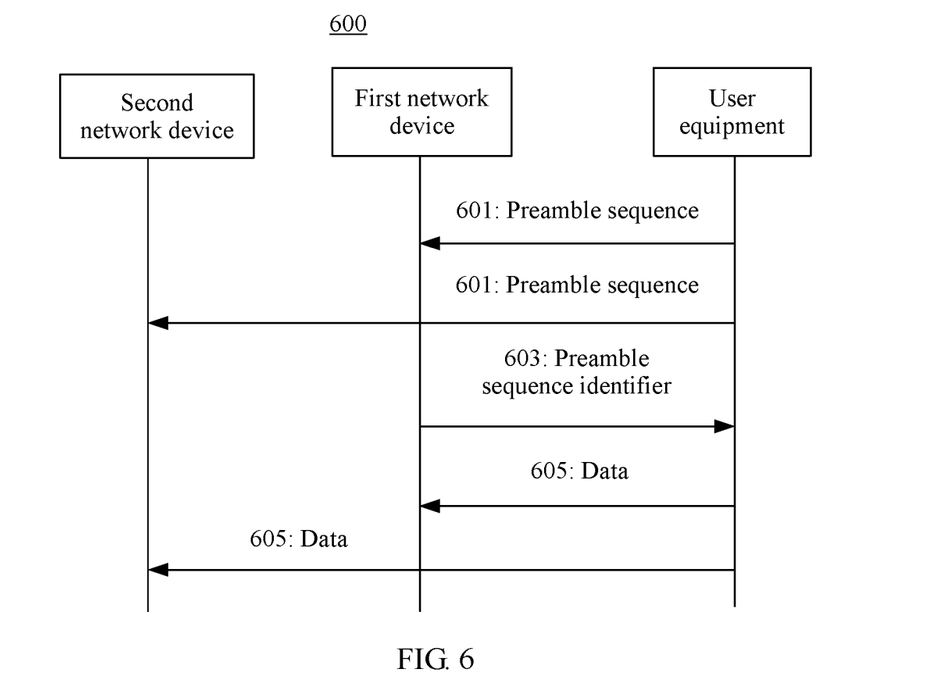
FIG. 6 is a schematic diagram of processing of another random access method according to an embodiment of this application.

FIG. 6 shows a random access method according to another embodiment of this application.

601: User equipment (English: user equipment, UE for short) sends a preamble sequence, where optionally, the user equipment sends the preamble sequence to one or more first network devices and/or one or more second network devices. "A plurality of" in this embodiment of the present invention means "two or more".

The one or more first network devices and/or the one or more second network devices may receive the preamble sequence, and the preamble sequence may be sent by the user equipment. It may also be understood that the one or more first network devices and/or the one or more second network devices may or may not be network devices that receive the preamble sequence. The first network device may be a network device that sends a random access response. The first network device may or may not be a network device that receives data, provided that the first network device is a network device that sends the random access response. The second network device is a network device that receives the data but does not send the random access response.

603: The one or more first network devices send a random access response, where the one or more first network devices may send the random access response to the UE.

The random access response may include information for sending the data, and the information for sending the data may include the following example content.

Content 5:

The information for sending the data may further include port information (certainly, the port information may also have another name), a port may be a virtual port, and the port information may be used to determine a beam for sending the data by the user equipment. Specifically, the port information may be used to determine sending time information for sending the data by the user equipment, to determine, based on the determined sending time information, the beam for sending data. Further, optionally, the port information may be used to determine a time-frequency resource for sending the data by the user equipment.

An example in which a correspondence is used for determining may be used to explain a determining method as follows: The port information may correspond to time-frequency resource information (for ease of description, the time-frequency resource information is denoted as T/F) and/or the sending time information. The sending time information may be a random access occasion (English: RACH Occasion, RO for short). Further, the time-frequency resource information and the sending time information may be time-frequency resource information for sending the data by the UE and the sending time information for sending the data by the UE. A same time-frequency resource block may correspond to different sending time, and different sending time may correspond to different beams (English: beam).

A relationship between the foregoing several parameters is described below by using an example, as shown in Table 1 to Table 3, in which the port information has a one-to-one correspondence with the time-frequency resource information and the sending time information, the sending time information has a one-to-one correspondence with beam information, and the sending time information is a RO.

In implementation, there may be various manners, and the manners are not limited to the foregoing example. For example, the UE may determine, based on a correspondence between port information and beam information, the beam for sending the data. Alternatively, for example, the UE may determine the sending time information based on a correspondence between port information and sending time information, and then determine, based on a correspondence between sending time information and beam information, the beam for sending the data. Alternatively, for example, the UE may determine, based on a correspondence between port information and time-frequency resource information, the time-frequency resource for sending the data. Because the information for sending the data includes the port information, the UE may not need to care a TRP to which the data is sent, provided that the data is sent by using the determined beam (further, on the determined T/F). The random access response includes the port information, to indicate a plurality of pieces of parameter information, thereby reducing an exchange amount of air interface signaling and improving air interface efficiency. Certainly, the correspondence is a one-to-one correspondence in the foregoing example. Certainly, the correspondence may alternatively be another correspondence. For example, a correspondence between a RO and a beam may be a one-to-multiple correspondence. Then, a plurality of beams are determined based on one RO, and the UE may send the data on the plurality of beams.

Content 6:

The information for sending the data may further include port information (the port information may have another name) and sending time information such as RACH occasion information, and the sending time information may be used to determine a beam for sending the data. The information for sending the data may further include port information (the port information may have another name), and the port information may be used to determine a time-frequency resource for sending the data. In implementation, the beam for sending the data and the time-frequency resource for sending the data may be determined based on a correspondence, and a specific method may be similar to the description in the content 5. This manner differs from the manner in the content 5 in that the port information does not indicate the sending time information. Although an exchange amount of air interface signaling is larger than that in the previous manner, there is a more explicit instruction. For description of another aspect of this manner, refer to the manner in the content 5. Details are not described again.

Content 7:

The information for sending the data may further include time-frequency resource information and beam information. In this manner, a relatively low capability of the UE is required. The UE may directly send the data based on the time-frequency resource information and the beam information that are carried in the information for sending the data. Therefore, the UE may send the data based on the received information by using a time-frequency resource and a beam that are indicated by the information for sending the data.

Content 8:

The information for sending the data may include network device information and beam information that is used by a network device to receive the preamble sequence. The UE may determine, based on the network device information and beam information that is used by the network device to receive a message, a beam for sending the data by the UE. Further, the random access response may include time-frequency resource information, and the time-frequency resource information may be used to determine a time-frequency resource for sending the data. In implementation, the beam for sending the data by the UE may be determined based on a correspondence, stored by the UE, between beam information for sending the data by the UE and each of network device information and beam information that is used by the network device to receive the preamble sequence. Certainly, in implementation, the user equipment may alternatively determine, by jointly using the network device information, the beam information that is used by the network device to receive the preamble sequence, and the time-frequency resource information, the beam for sending the data. In specific implementation, a determining method may be determined based on a correspondence. A specific method may be similar to the description in the content 5, and details are not described again. In this embodiment, the UE may send the data on the time-frequency resource by using the determined beam.

The correspondences mentioned in the foregoing various manners each may be one-to-one correspondences, one-to-multiple correspondences, multiple-to-one correspondences, or multiple-to-multiple correspondences. The correspondence may be stored in the network device and/or the UE by using a list, a program, an algorithm formula, or the like.

605. The user equipment sends data.

The data may be sent and received in any one or a combination of the following manners:

Manner 1 is shown in FIG. 4.

The user equipment sends the data based on a received random response message. In some embodiments, for example, the UE may determine, based on the port information, the time-frequency resource for sending the data and/or the beam for sending the data, to send the data by using the determined time-frequency resource and/or the determined beam. The random response message received by the user equipment includes different information, and different time-frequency resources for sending the data and/or different beams for sending the data are determined. For a specific determining method, refer to the foregoing description. Details are not described again.

A plurality of network devices receive the data. In some embodiments, one or more or all of the plurality of network devices may receive the data by using a beam for receiving the preamble sequence. The plurality of network devices may include a first network device and a second network device, or may be a plurality of first network devices or a plurality of second network devices.

Manner 2 is shown in FIG. 5.

The user equipment sends the data in a beam sweeping manner.

One or more network devices may also receive the data in the beam sweeping manner. One network device in the "one or more network devices" may be one first network device or one second network device. A plurality of network devices in the "one or more network devices" may include a first network device and a second network device, or may be a plurality of first network devices or a plurality of second network devices. The one or more network devices may also search for an available beam in the beam sweeping manner, to receive the data. For example, the available beam is an optimal beam or a suboptimal beam.

It should be explained that the processing 605 is not a random access procedure, and is not necessary processing in this embodiment, but a data sending process after random access. The processing 605 is described in this embodiment to make this embodiment clearer.

It can also be learned from the embodiment in FIG. 6 that in a conventional communications network, usually, only one network device, for example, a radio access device NodeB provides a service for the UE. Certainly, this embodiment may also be applied to the conventional communications network. This embodiment may also be applied to a communications network in which a plurality of network devices may provide a service for the UE, and the network device may be transparent to the UE. In other words, the UE does not need to know a network device that serves the UE. Therefore, although a plurality of network devices may serve the UE, the random access response may be sent by only one or more of the network devices, and not all network devices that serve the UE need to send the random access response.

In addition, it can be further learned from the embodiment in FIG. 6 that in a high frequency scenario, in this solution, a beam mechanism may be used to flexibly perform sending and receiving by using a beam sweeping technology, or to perform directional sending and receiving by using a beam. The beam may be determined by using some parameters. For example, in the foregoing embodiment, the beam is determined by using a parameter carried in the information for sending the data.

Figure 7:
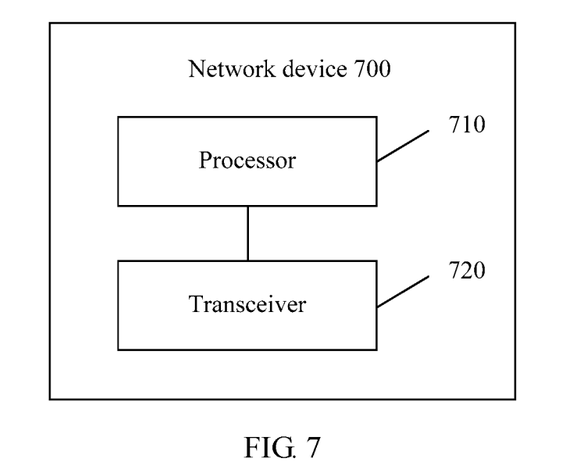
FIG. 7 is a schematic block diagram of a random access apparatus according to an embodiment of this application.

FIG. 7 is a schematic block diagram of a user equipment apparatus according to an embodiment of this application. As shown in FIG. 7, the apparatus 700 includes a processor 710 and a transceiver 720. The transceiver 720 may also be implemented by a transceiver unit or a transceiver circuit, and the processor 710 may be implemented by one or more units or circuits.

It should be understood that the apparatus 700 may correspond to the user equipment in each method embodiment, and may have any function of the user equipment in the method. The following uses only some functions as an example for description. However, this embodiment is not limited thereto.

The transceiver 720 may be configured to: send a preamble sequence, and receive a random access response. The random access response includes information for sending a message 3, and the information for sending the message 3 is used by user equipment to determine a beam for sending the message 3.

The processor 710 may be configured to determine, based on the information for sending the message 3, the beam for sending the message 3.

The transceiver 720 may be further configured to determine, by the user equipment based on port information, the beam for sending the message 3. The information for sending the message 3 includes the port information.

In some embodiments, the processor 710 is configured to: determine, based on the port information, sending time information for sending the message 3, and determine, based on the sending time information, the beam for sending the message 3.

In some embodiments, the processor 710 is configured to determine, based on the port information, a time-frequency resource for sending the message 3. The transceiver 720 is further configured to send the message 3 based on the determined time-frequency resource and beam for sending the message 3.

In some embodiments, the processor 710 is configured to determine, based on sending time information, the beam for sending the message 3. The information for sending the message 3 includes the sending time information.

In some embodiments, the processor 710 is configured to determine, based on the port information, a time-frequency resource for sending the message 3. The transceiver 720 is further configured to send the message 3 based on the determined time-frequency resource and beam for sending the message 3.

In some embodiments, the processor 710 is configured to determine, based on beam information, the beam for sending the message 3. The information for sending the message 3 includes the beam information.

In some embodiments, the processor 710 is configured to determine, based on network device information and beam information that is used by a network device to receive the preamble sequence, the beam for sending the message 3. The information for sending the message 3 includes the network device information and the beam information that is used by the network device to receive the preamble sequence.

In some embodiments, the apparatus is used in a communications network, the communications network includes a first network device and a second network device, and the second network device is a network device that receives the message 3 sent by the user equipment but does not send the random access response. The first network device is a network device that sends the random access response.

The transceiver 720 may be configured to: send a preamble sequence, and receive a random access response. The random access response includes information for sending data, and the information for sending the data is used by user equipment to determine a beam for sending the data.

The processor 710 may be configured to determine, based on the information for sending the data, the beam for sending the data.

The transceiver 720 may be further configured to determine, by the user equipment based on port information, the beam for sending the data. The information for sending the data includes the port information.

In some embodiments, the processor 710 is configured to: determine, based on the port information, sending time information for sending the data, and determine, based on the sending time information, the beam for sending the data.

In some embodiments, the processor 710 is configured to determine, based on the port information, a time-frequency resource for sending the data. The transceiver 720 is further configured to send the data based on the determined time-frequency resource and beam for sending the data.

In some embodiments, the processor 710 is configured to determine, based on sending time information, the beam for sending the data. The information for sending the data includes the sending time information.

In some embodiments, the processor 710 is configured to determine, based on the port information, a time-frequency resource for sending the data. The transceiver 720 is further configured to send the data based on the determined time-frequency resource and beam for sending the data.

In some embodiments, the processor 710 is configured to determine, based on beam information, the beam for sending the data. The information for sending the data includes the beam information.

In some embodiments, the processor 710 is configured to determine, based on network device information and beam information that is used by a network device to receive the preamble sequence, the beam for sending the data. The information for sending the data includes the network device information and the beam information that is used by the network device to receive the preamble sequence.

In some embodiments, the apparatus is used in a communications network, the communications network includes a first network device and a second network device, and the second network device is a network device that receives the data sent by the user equipment but does not send the random access response. The first network device is a network device that sends the random access response.

In some embodiments, the apparatus is applied to a high frequency scenario.

Figure 8:
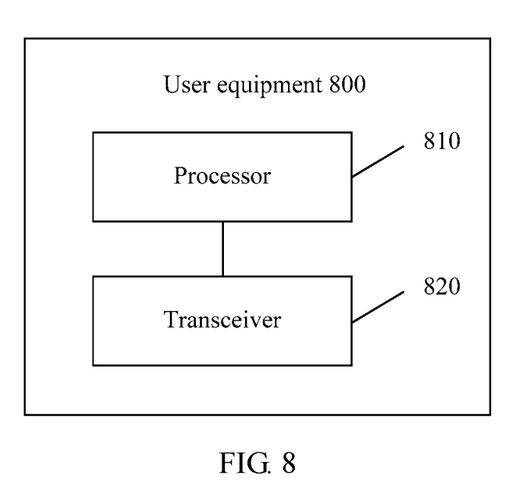
FIG. 8 is a schematic block diagram of other random access according to an embodiment of this application.

FIG. 8 is a schematic block diagram of a network device apparatus according to an embodiment of this application. As shown in FIG. 8, the apparatus 800 includes a processor 810 and a transceiver 820. The transceiver 820 may also be implemented by a transceiver unit or a transceiver circuit, and the processor 810 may be implemented by one or more units or circuits.

It should be understood that the apparatus 800 may correspond to the network device in each method embodiment, and may have any function of the network device in the method. The following uses only some functions as an example for description. However, this embodiment is not limited thereto.

The transceiver is configured to send a random access response. The random access response includes information for sending a message 3, and the information for sending the message 3 is used by user equipment to determine a beam for sending the message 3.

In some embodiments, the information for sending the message 3 includes port information, and the port information is used to determine the beam for sending the message 3.

In some embodiments, the port information is used to determine sending time information for sending the message 3, and the beam for sending the message 3 is determined based on the sending time information.

In some embodiments, the port information is further used to determine a time-frequency resource for sending the message 3.

In some embodiments, the information for sending the message 3 includes sending time information, and the sending time information is used to determine the beam for sending the message 3.

In some embodiments, the information for sending the message 3 further includes port information, and the port information is used to determine a time-frequency resource for sending the message 3.

In some embodiments, the information for sending the message 3 includes beam information, and the beam information is used to determine the beam for sending the message 3.

In some embodiments, the information for sending the message 3 includes the network device information and beam information that is used by the network device to receive a preamble sequence, and the network device information and the beam information that is used by the network device to receive the preamble sequence are used to determine the beam for sending the message 3.

In some embodiments, the transceiver is configured to: receive the preamble sequence, and receive the message 3 by using a beam for receiving the preamble sequence.

In some embodiments, the apparatus is applied to a high frequency scenario.

The apparatus is used in a communications network, the communications network includes the network device and a second network device, and the second network device is a network device that receives the message 3 sent by the user equipment but does not send the random access response.

The transceiver may be configured to send a random access response. The random access response includes information for sending data, and the information for sending the data is used by user equipment to determine a beam for sending the data.

In some embodiments, the information for sending the data includes port information, and the port information is used to determine the beam for sending the data.

In some embodiments, the port information is used to determine sending time information for sending the data, and the beam for sending the data is determined based on the sending time information.

In some embodiments, the port information is further used to determine a time-frequency resource for sending the data.

In some embodiments, the information for sending the data includes sending time information, and the sending time information is used to determine the beam for sending the data.

In some embodiments, the information for sending the data further includes port information, and the port information is used to determine a time-frequency resource for sending the data.

In some embodiments, the information for sending the data includes beam information, and the beam information is used to determine the beam for sending the data.

In some embodiments, the information for sending the data includes the network device information and beam information that is used by the network device to receive a preamble sequence, and the network device information and the beam information that is used by the network device to receive the preamble sequence are used to determine the beam for sending the data.

In some embodiments, the transceiver is configured to: receive the preamble sequence, and receive the data by using a beam for receiving the preamble sequence.

In some embodiments, the apparatus is applied to a high frequency scenario.

The apparatus is used in a communications network, the communications network includes the network device and a second network device, and the second network device is a network device that receives the data sent by the user equipment but does not send the random access response.

In some embodiments, the apparatus 700 and the apparatus 800 may further include a memory. The memory may store program code and other stored content, and the processor invokes the program code and the other content stored in the memory, to implement a corresponding function of the apparatus 700 and a corresponding function of the apparatus 800.

An implementation of this application further includes a communications system, including the network device in the network device embodiment and the user equipment in the user equipment embodiment.

The apparatus in the implementations of this application may be a field programmable gate array (Field Programmable Gate Array, FPGA), an application-specific integrated chip (Application-Specific Integrated Circuit, ASIC), a system on chip (System on Chip, SoC), a central processing unit (Central Processor Unit, CPU), a network processor (Network Processor, NP), a digital signal processor (Digital Signal Processor, DSP), a microcontroller (Micro Controller Unit, MCU), a programmable logic device (Programmable Logic Device, PLD), or another integrated chip.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again. For convenience and brevity, the method embodiments may be referenced with each other, and details are not described herein.

In the several embodiments provided in this application, it should be understood that the disclosed system, apparatus, and method may be implemented in other manners. For example, the described apparatus embodiments are merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some steps of the methods described in the embodiments of the present invention. The foregoing storage medium includes various media that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A random access method, comprising:
   sending, by user equipment, a preamble sequence to one or more network devices;
   receiving, by the user equipment, a random access response from the one or more network devices, wherein the random access response comprises information for sending a message to facilitate the user equipment to determine a beam for sending the message to a network device, wherein the information for sending the message comprises information regarding the network device and beam information used by the network device to receive the preamble sequence;

determining, by the user equipment, based on the information regarding the network device and the beam information, the beam for sending the message; and sending, by the user equipment, the message by using the determined beam.

2. The method according to claim 1, wherein the information for sending the message comprises port information; and, wherein determining, by the user equipment based on the information regarding the network device and the beam information, the beam for sending the message comprises:

determining, by the user equipment based on the port information, the beam for sending the message.

3. The method according to claim 2, wherein determining, by the user equipment based on the port information, the beam for sending the message comprises:

determining, by the user equipment based on the port information, sending time information for sending the message, and determining, based on the sending time information, the beam for sending the message.

4. The method according to claim 1, further comprising:

determining, by the user equipment based on port information, a time-frequency resource for sending the message, wherein sending, by the user equipment, the message by using the determined beam comprises:

sending, by the user equipment, the message based on the determined time-frequency resource and beam for sending the message.

5. The method according to claim 1, wherein the information for sending the message comprises time information for sending the message; and determining, by the user equipment based on the information regarding the network device and the beam information, the beam for sending the message comprises:

determining, by the user equipment based on the sending time information, the beam for sending the message.

6. The method according to claim 5, wherein the information for sending the message further comprises port information;

the user equipment determines, based on the port information, a time-frequency resource for sending the message; and sending, by the user equipment, the message by using the determined beam comprises:

sending, by the user equipment, the message based on the determined time-frequency resource and beam for sending the message.

7. The method according to claim 1, wherein the information for sending the message comprises beam information; and determining, by the user equipment based on the information regarding the network device and the beam information, the beam for sending the message comprises:

determining, by the user equipment based on the beam information, the beam for sending the message.

8. The method according to claim 1, wherein the method is applied to a high frequency scenario.

9. A random access method, comprising:

receiving, by a first network device, a preamble sequence from a user equipment;

sending, by the first network device, a random access response to the user equipment, wherein the random access response comprises information for sending a message to facilitate the user equipment to determine a beam for sending the message to a network device, wherein the information for sending the message comprises information regarding the network device and beam information used by a network device to receive the preamble sequence;

receiving, by the user equipment, the random access response from the first network device; and determining, by the user equipment, based on the information regarding the network device and the beam information, the beam for sending the message.

10. The method according to claim 9, wherein the information for sending the message comprises port information, and the port information is used to determine the beam for sending the message.

11. The method according to claim 10, wherein user equipment determining the beam for sending the message comprises:

determining, by the user equipment, based on the port information, sending time information for sending the message, and determining, based on the sending time information, the beam for sending the message.

12. The method according to claim 9, wherein the port information is further used to determine a time-frequency resource for sending the message.

13. The method according to claim 9, wherein the information for sending the message comprises sending time information, and the sending time information is for determining the beam for sending the message.

14. The method according to claim 13, wherein the information for sending the message further comprises port information, and the port information is for determining a time-frequency resource for sending the message.

15. The method according to claim 9, wherein the information for sending the message comprises beam information, and the beam information is used to determine the beam for sending the message.

* * * * *